United States Patent [19]
Matsuura

[11] Patent Number: 6,144,628
[45] Date of Patent: *Nov. 7, 2000

[54] INFORMATION REPRODUCING METHOD USING VARYING LASER POWER FOR MAGNETO-OPTICAL RECORDING MEDIUM AND MAGNETO-OPTICAL REPRODUCING DEVICE

[75] Inventor: Michio Matsuura, Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,711

[22] Filed: Sep. 18, 1996

[30] Foreign Application Priority Data

Apr. 5, 1996 [JP] Japan ..................... 8-084275

[51] Int. Cl.$^7$ ........................................ G11B 3/90
[52] U.S. Cl. ................. 369/58; 369/54; 369/116
[58] Field of Search .................. 369/50, 58, 47, 369/116, 32, 13, 54, 48, 275.1, 275.2, 284, 286, 288, 289, 694 ML, 694 MM; 428/694 RE, 694 EC

[56] References Cited

U.S. PATENT DOCUMENTS

| | | | |
|---|---|---|---|
| 5,579,294 | 11/1996 | Ohta et al. | 369/58 |
| 5,586,099 | 12/1996 | Finkelstein et al. | 369/116 |
| 5,617,400 | 4/1997 | Fuji | 369/116 |
| 5,691,072 | 11/1997 | Izumi et al. | 428/694 ML |

FOREIGN PATENT DOCUMENTS

| | | |
|---|---|---|
| 6044390 | 2/1994 | Japan . |
| 6223277 | 8/1994 | Japan . |
| 7307040 | 11/1995 | Japan . |
| 9515232 | 6/1995 | Rep. of Korea . |

*Primary Examiner*—Ali Neyzari
*Attorney, Agent, or Firm*—Greer, Burns & Crain, Ltd.

[57] ABSTRACT

In the information reproducing method, the information recording/reproducing method and the information reproducing device of this invention, the start of read of information from a magneto-optical recorded area of an MSR medium is detected, and the power of a light beam to be used for reproducing magneto-optically recorded information is set in accordance with the detection. Thus, the MSR medium can be irradiated with a light beam having an appropriate reproducing power without being affected by the fluctuation in various portions of the MSR medium.

19 Claims, 12 Drawing Sheets

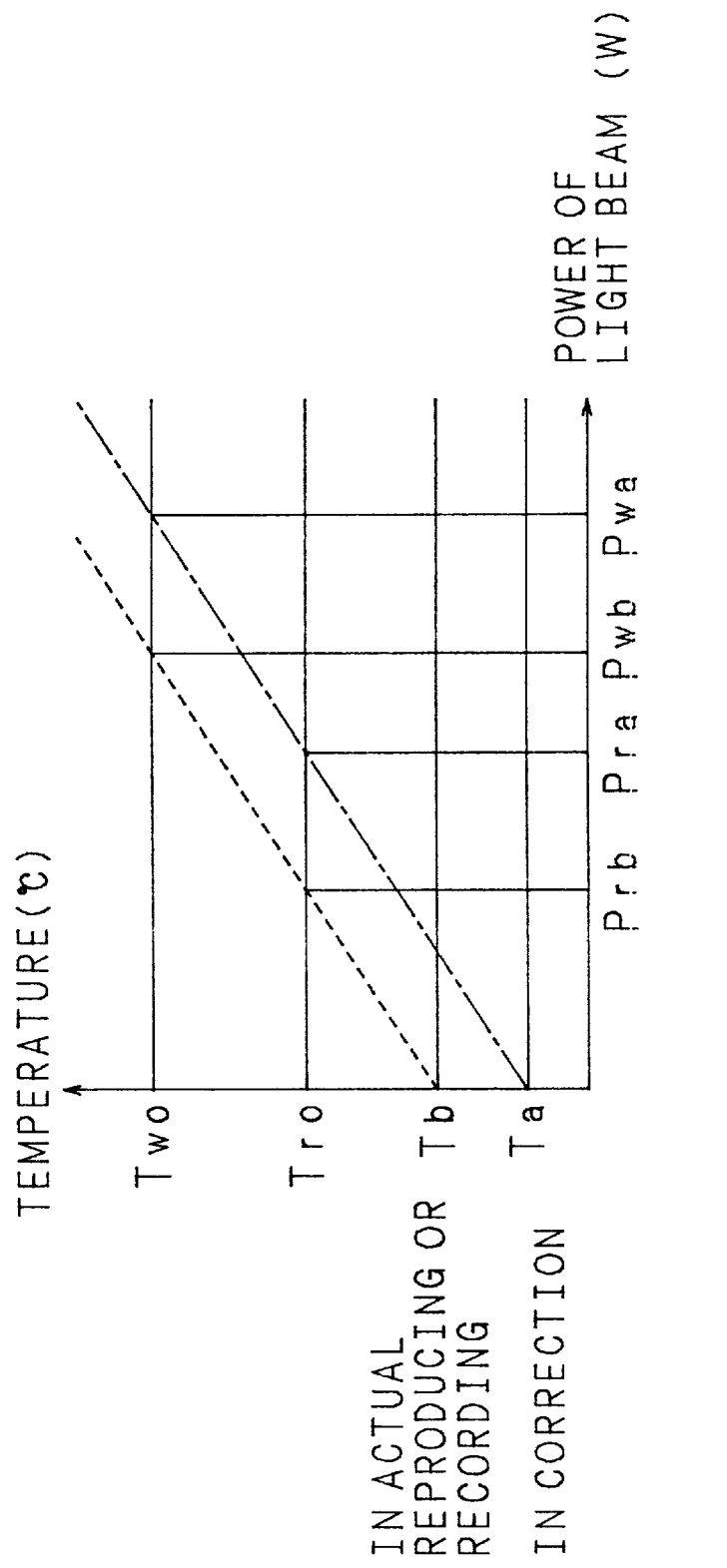

INFORMATION REPRODUCING METHOD USING VARYING LASER POWER FOR MAGNETO-OPTICAL RECORDING MEDIUM AND MAGNETO-OPTICAL REPRODUCING DEVICE

BACKGROUND OF THE INVENTION

1. Field of the Invention

The present invention relates to information reproducing and information recording/reproducing methods for a magneto-optical recording medium such as a magneto-optical disk, a magneto-optical tape and a magneto-optical card, in particular, a magnetically induced super resolution medium capable of magnetically induced super resolution reproduction, for use in a magneto-optical recording/reproducing device, and also relates to a magneto-optical reproducing device.

2. Description of Related Art

A magneto-optical disk has recently become popular as an external recording medium for a computer. In the magneto-optical disk, a record bit with a submicron size is formed on the medium through application of an external magnetic field and irradiation of a laser beam. Thus, the recording capacity can be remarkably increased as compared with that of a conventionally used external recording medium such as a flexible disk and a hard disk.

Meanwhile, information is recorded in a rewritable magneto-optical disk by heating a magneto-optical recording film thereon through beam irradiation, so as to change the magnetization direction (record bits) in the heated portion in accordance with an external magnetic field corresponding to the information to be recorded. In a reproducing operation, the magneto-optical recording film is irradiated with a light beam, so as to reproduce the recorded information by making use of the Kerr effect in that the plane of polarization of reflected light is rotated in accordance with the magnetization direction.

Such a magneto-optical disk has been regarded as a main memory for storing a mass of data in the rapidly developing multimedia, and there are increasing demands for further increasing its capacity. In order to increase the recording capacity of a magneto-optical disk, namely, in order to increase the recording density, it is necessary to further minimize the record bits as well as further decrease a pitch between the bits.

However, a conventional general magneto-optical recording/reproducing operation is limited by the size of a light beam (beam spot) on a medium. The beam spot can be made smaller in order to reproduce data from a bit with a smaller size than the diameter of the beam spot. Still, the minimization of the beam spot is limited because the beam spot is limited by the wavelength of a light source and the numeral aperture of an object lens.

In order to achieve high density recording, a magnetically induced super resolution medium (MSR medium) and a recording/reproducing method utilizing the MSR medium, in which data in a record bit smaller than a beam spot can be reproduced, are proposed (Japanese Patent Application Laid-Open Nos. 1-143041 (1989), 3-93058 (1991), 4-271039 (1992) and 5-12731 (1933)). In the recording/reproducing method, a recording medium including lamination of a plurality of magnetic layers respectively having different magnetic characteristics depending upon the temperature is used, so that the effect attained by a small beam spot can be attained by utilizing the temperature distribution caused in the beam spot on the recording medium. In this manner, recorded data can be definitely read even when the record bits are smaller than the beam spot.

Such an MSR medium is classified into the following three types: a front aperture detection (FAD) type as is shown in FIG. 1, in which a high-temperature area in a laser beam spot works as a masking portion and a low-temperature area works as an aperture from which bits are read (Japanese Patent Application Laid-Open No. 1-143041 (1989)); a rear aperture detection (RAD) type as is shown in FIG. 2, in which a low-temperature area in a laser beam spot works as a masking portion and a high-temperature area works as an aperture from which bits are read (Japanese Patent Application Laid-Open No. 3-93058 (1991)); and an RAD double-mask type as is shown in FIG. 3, in which a high-temperature area and a low-temperature area in a laser beam spot work as masking portions and an intermediate-temperature area works as an aperture from which bits are read (Japanese Patent Application Laid-Open No. 4-271039 (1992)).

Information recorded in the MSR medium of these types is conventionally reproduced by a technique disclosed in Japanese Patent Application Laid-Open No. 4-258831 (1992).

In this reproducing technique, a reference signal is previously recorded at a predetermined position such as an inner-most area and/or an outer-most area of the MSR medium. In a reproducing operation, the reference signal is first read, so as to determine an optimal reproducing power on the basis of the reference signal.

In this conventional technique, the determined optimal reproducing power is set and retained at a previously fixed value. However, the MSR medium may have a warp, and hence, the shape of a beam spot can be changed because of the so-called tilt, namely, because an incident beam, which is required to vertically enter the recording surface, actually enters the recording surface at an angle. As a result of this change, the reproducing power is decreased. Furthermore, a local blur caused by a fingerprint or the like on the surface of the MSR medium and variation in the characteristics of the recording surface due to fluctuation in the film thickness, the components and the like can also decrease the reproducing power. Such factors to decrease the reproducing power vary depending upon the location on the recording medium. In addition, the temperature on the medium is changed in a time lag between the correction of the reproducing power and an actual reproducing operation. Therefore, it is disadvantageously difficult to set optimal reproducing conditions.

Moreover, the optimal reproducing power means a reproducing power for attaining the maximum signal amplitude in the magnetically induced super resolution reproduction of a record bit in an aperture formed in a beam spot as is shown in FIGS. 1 through 3.

The MSR medium includes, however, a portion where information is magneto-optically recorded, that is, the so-called MO portion, such as a data portion, as well as a portion where information is recorded by forming an emboss bit on the medium, that is, the so-called emboss bit portion, such as an SM portion and an ID portion.

The information recorded in the emboss bit portion can be read by using a much smaller power than the optimal reproducing power.

In other words, when the optimal reproducing power is fixed at a predetermined value, the medium is heated by an unnecessarily large reproducing power in a tracking servo operation and a reproducing operation of the emboss bit portion such as the SM portion and the ID portion. As a result, the MSR medium can be degraded and a semiconductor laser used for irradiation can be degraded, which is one of the factors to shorten their lifetime.

SUMMARY OF THE INVENTION

The present invention was devised to overcome the aforementioned problems. One object of the invention is providing an information reproducing method for a magneto-optical recording medium in which the power of a light beam used for reproduction is controlled to be increased at appropriate timing, so as to set an appropriate reproducing power.

The information reproducing method of this invention comprises the steps of irradiating a magnetically induced super resolution (MSR) medium with a light beam so as to read information recorded in the MSR medium on the basis of light reflected by the MSR medium; detecting start of read of information from a portion where the information is magneto-optically recorded; setting a power of the light beam at an appropriate value in accordance with detection of the start of the read of the information; and reproducing the information recorded in the MSR medium on the basis of reflected light of the light beam having the power set at the appropriate value.

Accordingly, since the power of the light beam is set at an appropriate value by detecting the start of the magnetically induced super resolution reproduction, it is possible to accurately set an appropriate reproducing power for the magnetically induced super resolution reproduction without being affected by the fluctuation in the material of the MSR medium itself, a blur thereon and the like.

In the information reproducing method, the power of the light beam is set in a process of reading the information from a head of the portion where the information is magneto-optically recorded.

Accordingly, since the power of the light beam for information reproduction is controlled at the head of the magneto-optically recorded portion, not only information recorded at the head but also information recorded in a data portion can be reproduced without fail.

Alternatively, in the information reproducing method, the power of the light beam is set in a process of reading information from a synchronizing signal portion for attaining synchronization for reading information and/or a process of reading information from a resynchronizing signal portion for attaining resynchronization when the synchronization is lost.

Accordingly, since the power of the light beam for the information reproduction is controlled at the synchronizing signal portion and/or the resynchronizing signal portion, the power can be adjusted by utilizing these conventionally provided portions, and hence, there is no need to provide a separate area for the power adjustment of the light beam.

In the information reproducing method, the step of detecting the start of the read of the information from the portion where the information is magneto-optically recorded is conducted by detecting an abrupt rise of a reproducing signal.

Accordingly, since the start of the read of the information from the magneto-optically recorded portion is detected by using the rise of the amplitude of the reproducing signal, the start of the information reproduction can be accurately and definitely detected.

In another embodiment, the information reproducing method of this invention comprises the steps of irradiating an MSR medium with a light beam so as to read information recorded in the MSR medium on the basis of light reflected by the MSR medium; detecting a rise of a control signal for gain adjustment to be applied to an amplitude of a signal corresponding to the information read from the MSR medium; setting a power of the light beam at an appropriate value in accordance with detection of the rise; and applying the gain adjustment to the information read from the MSR medium on the basis of reflected light of the light beam having the power set at the appropriate value, so as to reproduce the information from the MSR medium.

Accordingly, since the power of the light beam is set at an appropriate value by detecting the rise of an automatic gain control (AGC) signal, the reproducing power can be appropriately set without being affected by the fluctuation in the material of the MSR medium, a blur thereon and the like.

In still another embodiment, the information reproducing method of this invention comprises the steps of irradiating an MSR medium with a light beam whose power is controlled to be increased; and reproducing information recorded in the MSR medium on the basis of reflected light of the light beam from the MSR medium.

Accordingly, the power of the light beam used for reproducing information from magneto-optical recording media including an MSR medium is controlled to be increased. Therefore, the power of the light beam can be small in a tracking servo operation and at the initial stage of a reproducing operation, and in a reproducing operation for necessary data and the like, the information can be definitely reproduced by using a large reproducing power.

The second object of the invention is providing an information recording/reproducing method for an MSR medium in which the power of a light beam used for information recording can be set more accurately by allowing the power of the light beam used for information recording to be influenced by the power of a light beam used for information reproduction.

The information recording/reproducing method of this invention comprises the steps of reproducing information recorded in an MSR medium, by irradiating the MSR medium with a light beam, on the basis of reflected light of the light beam from the MSR medium; setting a power of the light beam so as to be influenced by a power of the light beam used in the step of reproducing the information; and recording information in the MSR medium by irradiating the MSR medium with the light beam having the set power.

Accordingly, since the power of the light beam for information recording is influenced by the power of the light beam for information reproduction, the recording power can be more appropriately set in consideration of the temperature of the medium.

Furthermore, the third object of the invention is providing a magneto-optically reproducing device for an MSR medium in which a reproducing power is increased in a stepwise manner and is set at an appropriate value by using first, second and third reproducing power application means, so that the reproducing power for information reproduction can be limited to a necessary and minimized power, thereby suppressing degradation of the MSR medium, a light beam source and the like and elongating their lifetime.

The magneto-optically reproducing device of this invention comprises an optical head for irradiating an MSR medium with a light beam and receiving reflected light from the MSR medium; first reproducing power application means for supplying the optical head with a power of the light beam with which information can be reproduced from a part of the MSR medium excluding a magneto-optically recorded area; second reproducing power application means for controlling to increase the power to be supplied to the optical head until the power becomes sufficiently large to reproduce information from the magneto-optically recorded area of the MSR medium; and third reproducing power application means for supplying the optical head with a constant power so that the power of the light beam to is set at an optimal value.

Accordingly, the reproducing power is set through three steps by using the first, second and third reproducing power application means. Therefore, information can be reproduced from a portion where the information is magneto-optically recorded as well as a portion where the information is recorded by using another method than the magneto-optically recording method by using respectively appropriate reproducing powers. As a result, the degradation of the MSR medium and the light beam source can be suppressed.

The above and further objects and features of the invention will more fully be apparent from the following detailed description with accompanying drawings.

BRIEF DESCRIPTION OF THE DRAWINGS

FIG. 5 is a graph for illustrating a second principle adopted in the present invention;

DETAILED DESCRIPTION OF THE INVENTION

The present invention will now be specifically described referring to the accompanying drawings illustrating the embodiments thereof.

Figure 1:
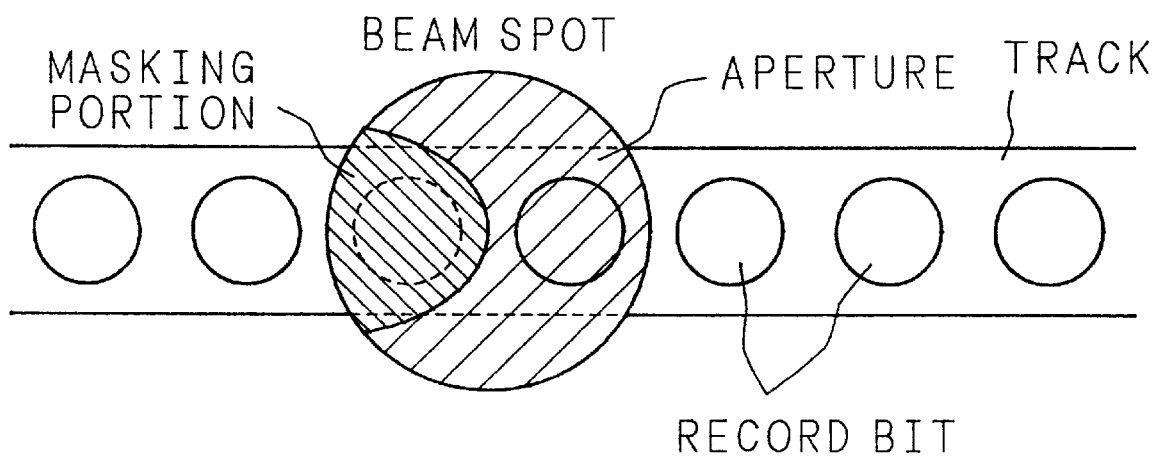
FIG. 1 is a diagram for illustrating a conventionally adopted principle of reproduction of an MSR medium.
Figure 2:
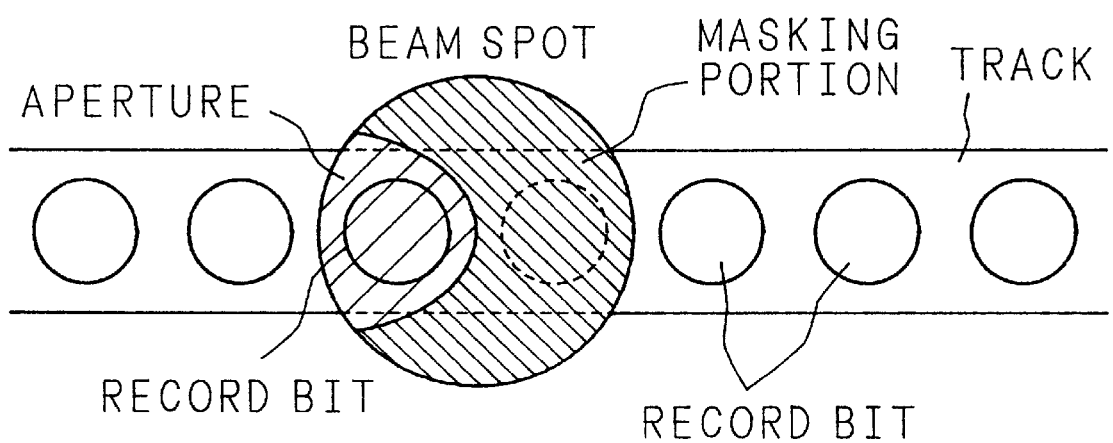
FIG. 2 is a diagram for illustrating another conventionally adopted principle of reproduction of the MSR medium.
Figure 3:
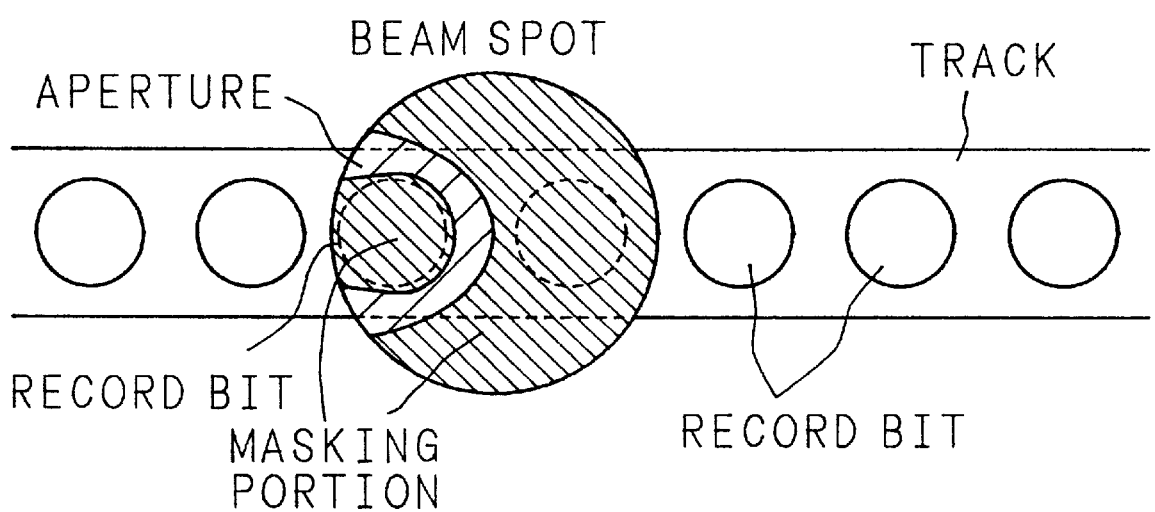
FIG. 3 is a diagram for illustrating still another conventionally adopted principle of reproduction of the MSR medium.
Figure 4A:
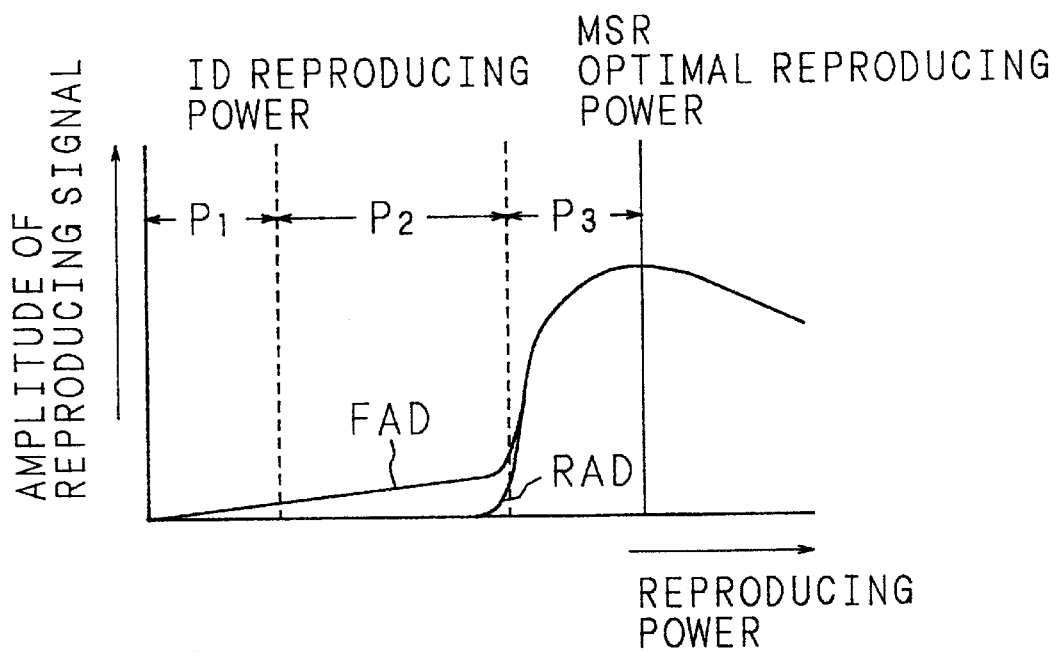
FIGS. 4A and 4B show principles of a control pattern for a reproducing power in the present invention.
Figure 4B:
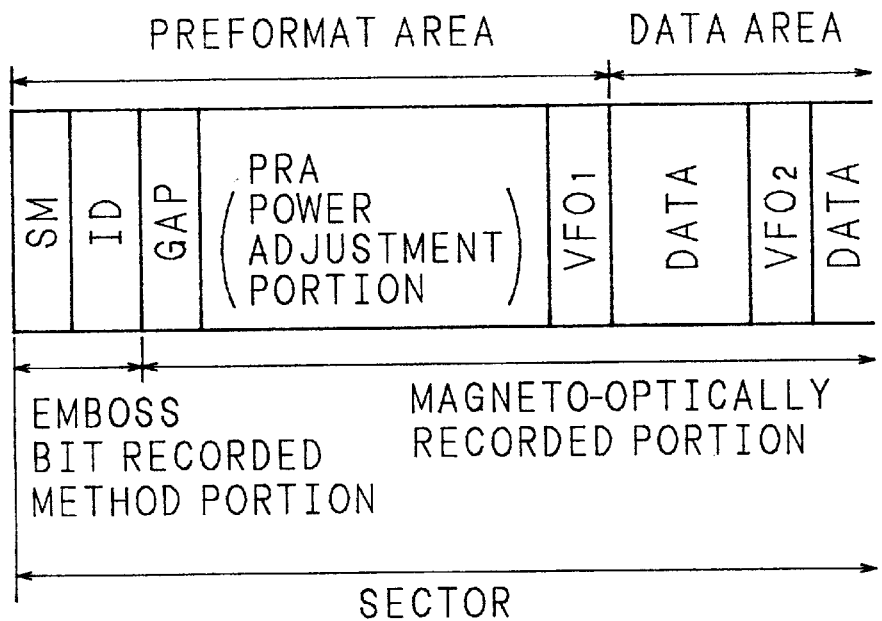

First, the principles adopted in the invention will be described. FIGS. 4A and 4B show the principles of a control pattern for a reproducing power, in which the relationship between a power of a laser beam required for reading information recorded in an MSR medium, that is, the so-called reproducing power, and the amplitude of a reproducing signal of information read from the head of a sector, which is a defined unit area for information transfer or the like.

FIG. 4A shows the relationship between a reproducing power and the amplitude of a reproducing signal in an FAD type medium and an RAD type medium among the aforementioned MSR medium, wherein the abscissa indicates the reproducing power and the ordinate indicates the amplitude of a reproducing signal. FIG. 4B shows a format in the head of one sector in an MSR medium.

When the reproducing power is fixed at a predetermined large value, not only the high reproducing power deviates from an optimal reproducing power depending upon the various conditions of the MSR medium but also the MSR medium and a semiconductor laser used for irradiation can be degraded due to heat as described above.

Therefore, in this invention, the reproducing power is controlled to be increased through three steps in accordance with a portion from which information is to be reproduced in each sector of the MSR medium, and the optimal reproducing power is set as the third step.

In the MSR medium, information is recorded in each sector as is shown in FIG. 4B, and each sector includes a preformat area and a data area.

In the preformat area, information is recorded by an emboss bit method on the medium. The preformat area includes a portion from which the information can be read with a small power, such as a sector mark (SM) portion and an identification (ID) portion, and a portion in which the information is magneto-optically recorded and from which the information is read with a large power, such as a power adjustment (PRA) portion, a synchronizing signal ($VFO_1$) portion and a resynchronizing signal ($VFO_2$) portion.

In the data area (DATA portion), the information is magneto-optically recorded and a large power is required to reproduce the information recorded therein.

Meanwhile, as is shown in FIG. 4A, in reproducing the information from the sector, the information which is recorded in the SM portion and the ID portion and corresponds to the contents of the sector is reproduced with a small reproducing power $P_1$.

Then, a reproducing power $P_2$, which is gradually increased until the start of magneto-optical reproduction (magnetically induced super resolution reproduction) of the PRA portion where the information is magneto-optically recorded, is added to the reproducing power $P_1$, and the actual start of the magneto-optical reproduction (magnetically induced super resolution reproduction) is confirmed through, for example, detection of a rise of a reproducing signal amplitude. By adding a reproducing power $P_3$ to the reproducing power at this point (i.e., the reproducing power $P_1+P_2$), the optimal reproducing power $(P_1+P_2+P_3)$ for reading the information from the DATA portion is determined.

FIG. 5 illustrates the contents of the second principle used in this invention, wherein the abscissa indicates a power (w) of a light beam and the ordinate indicates a temperature (°C.). In FIG. 5, a dashed line indicates a temperature Ta of a medium in a trial reading and writing operation, and a broken line indicates a temperature Tb of the medium in an actual reading and writing operation.

Even though the reproducing conditions such as a reproducing power and the recording conditions such as a recording power are set through the trial reading or writing operation after loading the MSR medium, there is unavoidably a given time lag between the correction through the trial reading or writing operation and the actual reading or writing operation. Therefore, the temperature of the loaded MSR medium increases during the time lag due to the heat of peripheral equipment.

Accordingly, the reproducing or recording conditions in the trial reading or writing operation deviate from the optimal conditions for the actual reproducing or recording operation by the increased temperature of the medium.

Therefore, when the reproducing power or the recording power is decreased in the actual reproducing or recording operation correspondingly to the increased temperature of the medium, the information can be reproduced or recorded in the actual reproducing or recording operation under the same temperature condition as that in the correction through the trial operation.

In FIG. 5, through the irradiation of a light beam, heat is not stored but is instead emitted because the irradiation energy itself is small, and hence, the temperature of the medium increases in proportion to the irradiation power.

The temperature of the medium in the correction is indicated as Ta, a corrected beam power for a reproducing operation is indicated as Pra, and a corrected beam power for a recording operation is indicated as Pwa. The temperature of the medium in an actual reproducing or recording operation is indicated as Tb. Then, in order to attain the same conditions at temperatures Tro and Two, the beam power for an actual reproducing operation and the beam power for an actual recording operation are required to be decreased to powers Prb and Pwb, respectively, so as to offset the increased temperature of the medium. Between the beam powers and the temperatures, the relationships represented by the following formulas (1) and (2) hold in the trial reading and writing operations:

$$Tro = \alpha \cdot Pra + Ta \quad (1)$$

$$Two = \alpha \cdot Pwa + Ta \quad (2)$$

wherein $\alpha$ indicates a coefficient (°C./w).

On the other hand, the relationship represented by the following formulas (3) and (4) hold in the actual reproducing and recording operations:

$$Tro = \alpha \cdot Prb + Tb \quad (3)$$

$$Two = \alpha \cdot Pwb + Tb \quad (4)$$

By using the relationship of (1)−(2)=(3)−(4) so as to eliminate Tro, Two, $\alpha$, Ta and Tb from the formulas (1) through (4), the following formula (5) is obtained:

$$Pwb = Pwa + k (Prb - Pra) \quad (5)$$

wherein k indicates a correction coefficient (dimensionless).

As is obvious from the formula (5), the recording power Pwb is obtained by adding the variation k(Prb−Pra) of the reproducing power to the writing power Pwa for the trial writing operation. It is noted that k is logically one, namely, Pra−Prb=Pwa−Pwb, but that actually k<1 because Pra−Prb is not actually equal to Pwa−Pwb depending upon the material, the structure and the like of the medium.

On the basis of the aforementioned principles, the embodiments of the invention will now be described.

Embodiment 1

Figure 6:
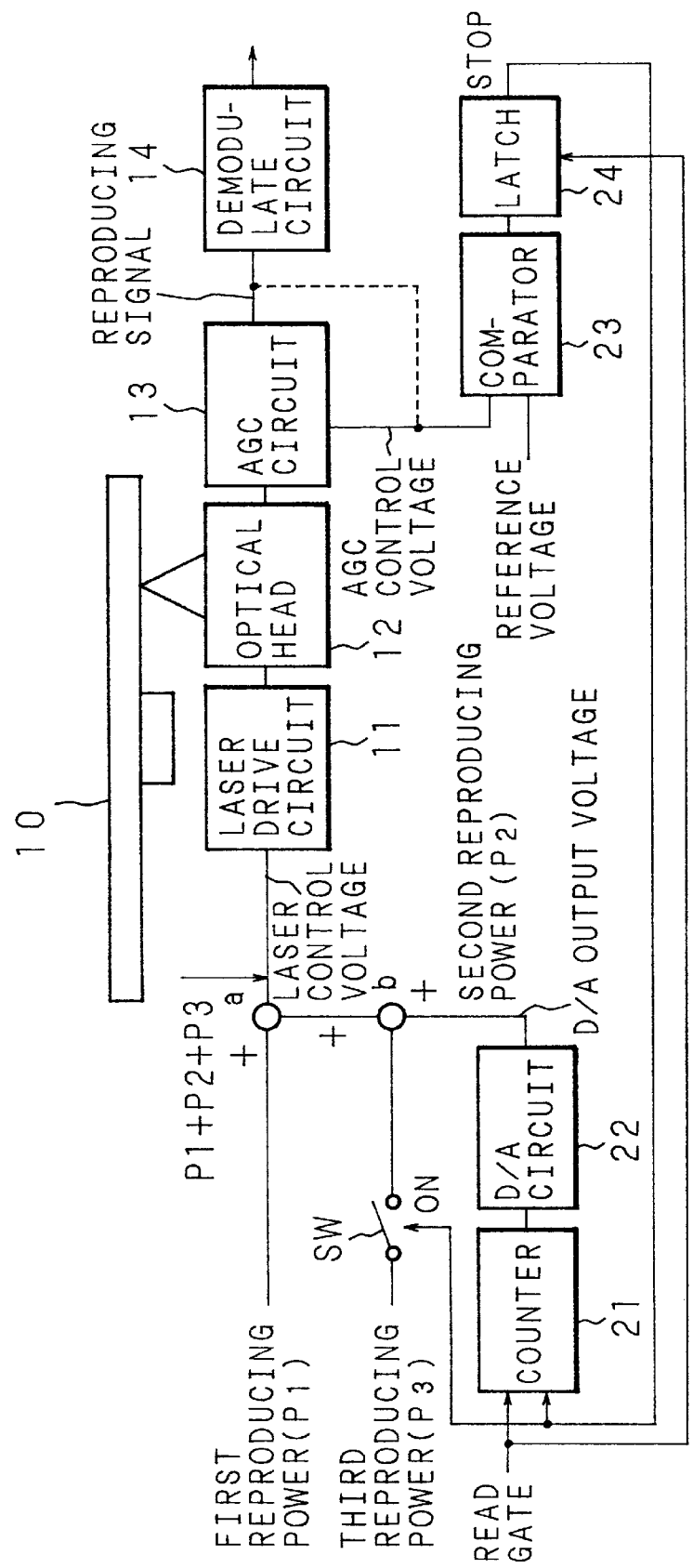
FIG. 6 is a block diagram for showing the configuration of a device of a first embodiment of the invention.

FIG. 6 is a block diagram for showing the configuration of a device of this embodiment, wherein a reference numeral 10 denotes a magneto-optical disk and a reference numeral 12 denotes an optical head. The magneto-optical disk 10 is an MSR medium, in which information is recorded in each sector along a track and from which the information recorded in each sector can be reproduced.

A sector is a unit area which is dealt with as a unit in order to improve the transfer efficiency in data transfer between the medium and a computer, and is divided into two types, namely, one with a length of 512 bytes and the other with a length of 2048 bytes.

The magneto-optical disk 10 can be the MSR medium or a general magneto-optical recording medium, both of which the present invention is applicable to.

The MSR medium is classified into the aforementioned two types, the FAD type medium and the RAD type medium. The RAD type medium is classified into two types, a single-mask RAD type and a double-mask RAD type.

Figure 7A:
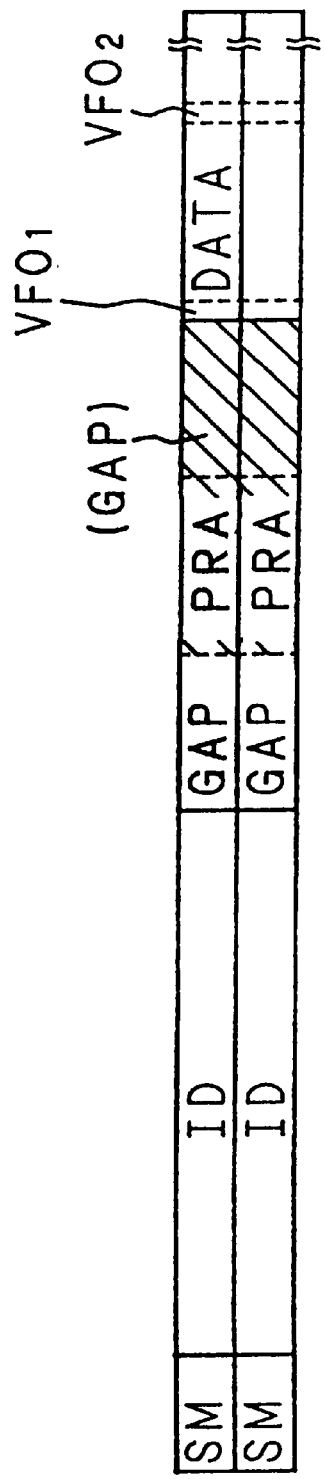
FIGS. 7A and 7B are diagrams for showing formats of a recording sector.

FIG. 7A is an explanatory diagram for showing an example of a format of a recording sector in the MSR medium. In the recording sector, a sector mark (SM) portion for indicating the start of the sector, an identification (ID) portion for sector management information, a gap (GAP) portion where no information is recorded, a power adjustment (PRA) portion for adjusting the reproducing and recording powers and a data (DATA) portion are disposed in this order.

At the head of the DATA portion, a synchronizing signal ($VFO_1$) portion is provided for phase synchronization by a PLL (phase locked loop circuit) for reading information from the DATA portion and for synchronization of gain adjustment by an AGC circuit. At an appropriate position in the DATA portion, a resynchronizing signal ($VFO_2$) portion is provided for resynchronization in the case where the synchronization is lost.

The SM portion, the ID portion, the GAP portion, the PRA portion, the $VFO_1$ portion and the $VFO_2$ portion together form the preformat area.

In the SM portion and the ID portion, information is recorded by the emboss bit method in which an emboss bit is formed on the medium. In the other portions such as the PRA portion and the DATA portion, information is recorded by reversal of magnetization, namely, the magneto-optical recording method, that is to say, the so-called MO method, in which the recorded information is read on the basis of change of a polarizing angle of reflected light.

Figure 7B:
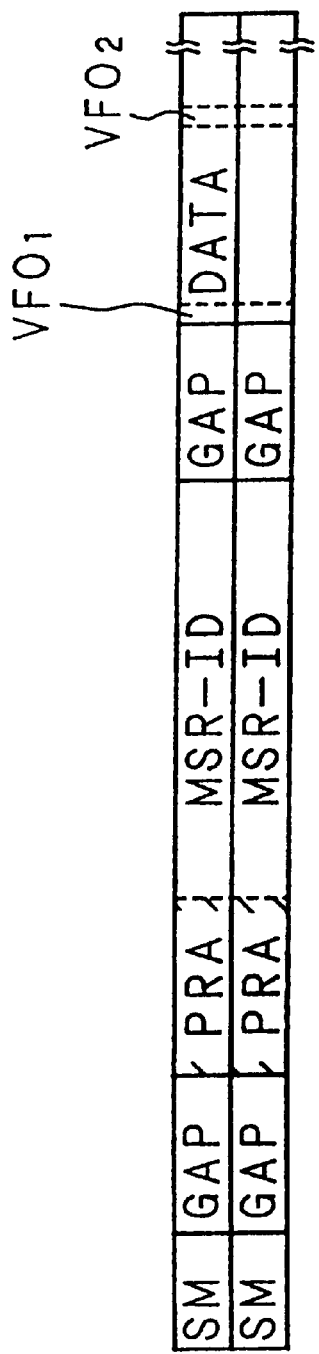

FIG. 7B is an explanatory diagram for showing another example of the format of the sector, in which an SM portion, a GAP portion, a PRA portion, an MSR-ID portion (where information to be recorded in the ID portion is magneto-optically recorded), a GAP portion and a DATA portion are provided in this order.

In this format, the SM portion, the PRA portion and the MSR-ID portion together form the preformat area. Information is recorded by the emboss bit method in the SM portion alone, and is recorded by the MO method in the other portions.

A $VFO_1$ portion and a $VFO_2$ portion of this format are identical to those shown in FIG. 7A.

In the examples shown in FIGS. 7A and 7B, the PRA portion is provided to each sector. However, the information recorded in the PRA portion is signal data with a constant cycle, and is substantially the same as an amplitude phase reference signal recorded in the $VFO_1$ portion and the $VFO_2$ portion. Therefore, instead of providing the PRA portion to each sector, the $VFO_1$ portion and/or the $VFO_2$ portion can be used as the power adjustment portion.

In FIG. 6, the optical head 12 includes a semiconductor laser (not shown). The semiconductor laser is operated on the basis of a drive current supplied by a laser drive circuit 11, so as to irradiate the surface of the magneto-optical disk 10, i.e., the MSR medium, with a laser beam and receive reflected light from the surface of the magneto-optical disk 10, and converts the received reflected light into an electrical reproducing signal, which is outputted to an AGC circuit 13.

The AGC circuit 13 performs gain control of the reproducing signal from the optical head 12 by adjusting an AGC control voltage, so as to make substantially constant the amplitude of a demodulation signal of a demodulating circuit 14, and outputs the resultant signal to the demodulating circuit 14.

The initial AGC control voltage is set so as to obtain the maximum gain.

The demodulating circuit 14 demodulates the reproducing signal which is received after the gain control, and outputs the demodulated signal.

The configuration described so far is well known as a general configuration of the device.

This embodiment is characterized by the following: In the reproduction of information recorded in the magneto-optical disk 10, a reproducing power controlled to be increased through three steps at appropriate timing is supplied to the laser drive circuit 11 for driving the semiconductor laser of the optical head 12. Thus, the optimal reproducing power for the magnetically induced super resolution reproduction of the MSR medium is set prior to reading the information from the DATA portion of the sector.

Specifically, as is shown in FIG. 6, the laser drive circuit 11 is supplied with a first reproducing power $P_1$ (indicator voltage: 1 through 1.5 mw) through an interposed adding point "a" by first reproducing power application means, a second reproducing power $P_2$ (variable voltage for adjustment) through adding points "b" and "a" by a D/A circuit 22 serving as second reproducing power application means, and a third reproducing power $P_3$ (auxiliary voltage) through an interposed normally open switch SW and the adding points "b" and "a" by third reproducing power application means.

The first reproducing power $P_1$ is an idle power, and is set at a minimum voltage required for driving servo systems such as a focus servo and a tracking servo and for reproducing the information recorded by the emboss bit method in the SM portion, the ID portion and the like of the preformat area of the MSR medium. When the first reproducing power $P_1$ is supplied to the laser drive circuit 11, a correspondingly predetermined current flows to the semiconductor laser of the optical head 12, so as to irradiate the magneto-optical disk 10 with a laser beam. On the basis of the light reflected by the magneto-optical disk 10, the information recorded by the emboss bit method is reproduced.

The reproducing system to be used for this operation is known and not specifically shown.

The second reproducing power $P_2$ is supplied by the D/A circuit 22. The second reproducing power, namely, a voltage, supplied by the D/A circuit 22 is substantially linearly increased from a voltage of 0 V in accordance with a count value of a counter 21. When the counter 21 stops its counting operation during the voltage increase, the second reproducing power $P_2$ is retained at a voltage value attained when the counter 21 stops.

The maximum voltage supplied by the D/A circuit 22 is set at a necessary and sufficient value at which an aperture is formed so as to start magnetically induced super resolution reproduction of information recorded in the aperture when a laser beam having a power of the sum of the first and second reproducing powers, that is, a power $P_1+P_2$, irradiates the MSR medium.

Furthermore, the third reproducing power $P_3$ is set at a substantially constant value (0.3 through 0.5 mw), and is previously experimentally determined so that a total power $P_1+P_2+P_3$ obtained by adding the third reproducing power $P_3$ to the power $P_1+P_2$ can be the optimal reproducing power for the magnetically induced super resolution reproduction of the information recorded in the MSR medium.

In FIG. 6, a value of a read gate is outputted by a control unit not is supplied to the counter 21 and a latch 24.

The control unit sets the read gate at "1", namely, opens the read gate, at appropriate timing on the basis of a signal read from the SM portion of the MSR medium, and sets the read gate at "0", namely, closes the read gate, on the basis of a signal corresponding to the end of the DATA portion.

The counter 21 starts its counting operation when the read gate is set at "1", namely, is opened, and outputs the count value to the D/A circuit 22. When the latch 24 is set, the counter 21 stops the counting operation.

A comparator 23 compares the AGC control voltage of the AGC circuit 13 with a previously determined reference voltage $V_0$. When the AGC control voltage becomes equal to the reference voltage $V_0$, the comparator 23 outputs a predetermined signal to the latch 24, so as to set the latch 24.

The reference voltage $V_0$ is set at a value at which an abrupt rise of the AGC control voltage of the AGC circuit 13 (see FIG. 8), which is caused by forming the aperture on the MSR medium for starting the magnetically induced super resolution reproduction of information in the aperture, can be detected.

In addition to the comparison between the AGC control voltage of the AGC circuit 13 and the reference voltage $V_0$, the comparator 23 can compare the amplitude of the reproducing signal outputted by the AGC circuit 13 after the gain control with a correspondingly predetermined reference value. In this case, an abrupt rise of the amplitude of the reproducing signal as is shown in FIG. 4A (or FIG. 8), that is, the formation of the aperture on the MSR medium for starting the magnetically induced super resolution reproduction, can be detected.

The latch 24 is set in response to the signal from the comparator 23, and outputs a set signal to the counter 21 and the switch SW. The latch 24 is reset by setting the read gate at "0", namely, by closing the read gate.

Next, the operation of this embodiment will be described referring to a time chart shown in FIG. 8.

Figure 8:
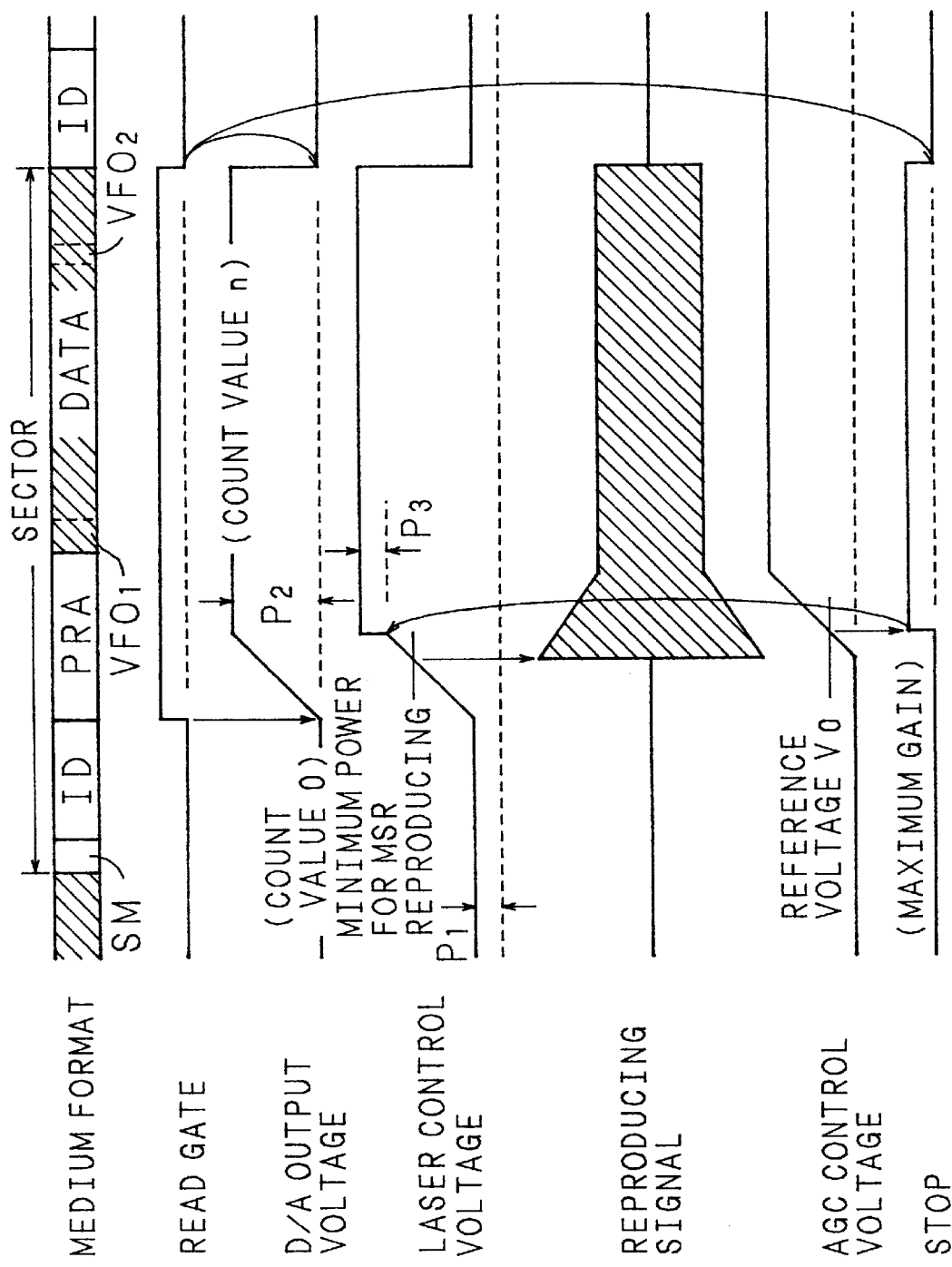
FIG. 8 is a time chart for showing the operation of a first embodiment of the invention.

FIG. 8 also shows the format of the medium shown in FIG. 4A.

When the power supply is turned on and the magneto-optical disk 10 is loaded, the idle power, that is, the first reproducing power $P_1$, is supplied to the laser drive circuit 11 by the first reproducing power application means.

As a result, the magneto-optical disk 10 is driven to rotate, and the optical head 12 irradiates the magneto-optical disk 10 with a laser beam having the first reproducing power $P_1$, thereby reading the signals recorded in the SM portion and the ID portion of a sector in the MSR medium.

When the read information is compared with and found to accord with the information of an instructed sector, the read gate is set at "1", namely, is opened, by the control unit (not shown) as is shown in FIG. 8.

Thus, the latch 24 is reset and the counter 21 starts the counting operation. In accordance with the count value of the counter 21, the second reproducing power $P_2$ supplied by the D/A circuit 22 starts to be substantially linearly increased.

As a result, the first reproducing power $P_1$ and the second reproducing power $P_2$ are added to each other at the adding point "a", and the laser drive circuit 11 is supplied with the power $P_1+P_2$ as the laser control voltage. Thus, a current corresponding to this laser control voltage is supplied to the semiconductor laser of the optical head 12.

On the other hand, the magneto-optical disk 10 is rotated so as to allow the optical head 12 to oppose the PRA portion where the information is recorded by the MO method after opposing the ID portion and the GAP portion. During this rotation, the second reproducing power $P_2$ is increased, so that the power $P_1+P_2$ approximates a power for starting the magnetically induced super resolution reproduction of the MSR medium.

While the optical head 12 is opposing the PRA portion, the temperature of the MSR medium reaches a temperature at which an aperture is formed on the MSR medium. Thus, the aperture is formed and the information recorded therein is magnetically reproduced with super resolution. As a result, the amplitude of the reproducing signal abruptly rises as is shown in FIG. 8.

The amplitude of the reproducing signal is thus increased abruptly because the initial AGC control voltage of the AGC circuit 13 is set to obtain the maximum gain as described above.

Immediately after this, the AGC circuit 13 is operated, so as to increase the gain control voltage, namely, to decrease the gain. Accordingly, the amplitude of the reproducing signal is also gradually decreased.

The AGC control voltage of the AGC circuit 13 is compared with the previously determined reference voltage $V_0$ by the comparator 23. When the AGC control voltage becomes equal to the reference voltage $V_0$, the latch 24 is set in response to the signal from the comparator 23, and the latch signal outputted by the latch 24 is supplied to the counter 21 and the switch SW.

In response to this signal, the counter 21 stops the counting operation (at a count value n) as is shown in FIG. 8, and the second reproducing power $P_2$ stops increasing and is retained at a voltage attained when the counter 21 stops. Furthermore, the switch SW is turned on, so that the third reproducing power $P_3$ is added to the second reproducing power $P_2$ at the adding point "b". In this manner, the laser control voltage is set at the reproducing power $P_1+P_2+P_3$ optimal to the magnetically induced super resolution reproduction.

By using this reproducing power $P_1+P_2+P_3$, the information is reproduced from the PRA portion, the $VFO_1$ portion and the DATA portion, and the reproduced information is outputted through the demodulating circuit 14.

When the DATA portion is completed to be reproduced, the read gate is set at "0" as is shown in FIG. 8, the counter 21 is cleared, and the second reproducing power $P_2$ becomes 0 V. Also, the latch 24 is reset, the switch SW is turned off, and the laser control voltage returns to the voltage of the first reproducing power $P_1$. Thus, the device is placed in a standby state for the process of a subsequent sector.

It is because of delay in signal transfer that there is a time lag between the time when the amplitude of the reproducing signal is abruptly increased and the time when the AGC control voltage becomes equal to the reference voltage $V_0$ or when the second reproducing power $P_2$ stops increasing.

Figure 9:
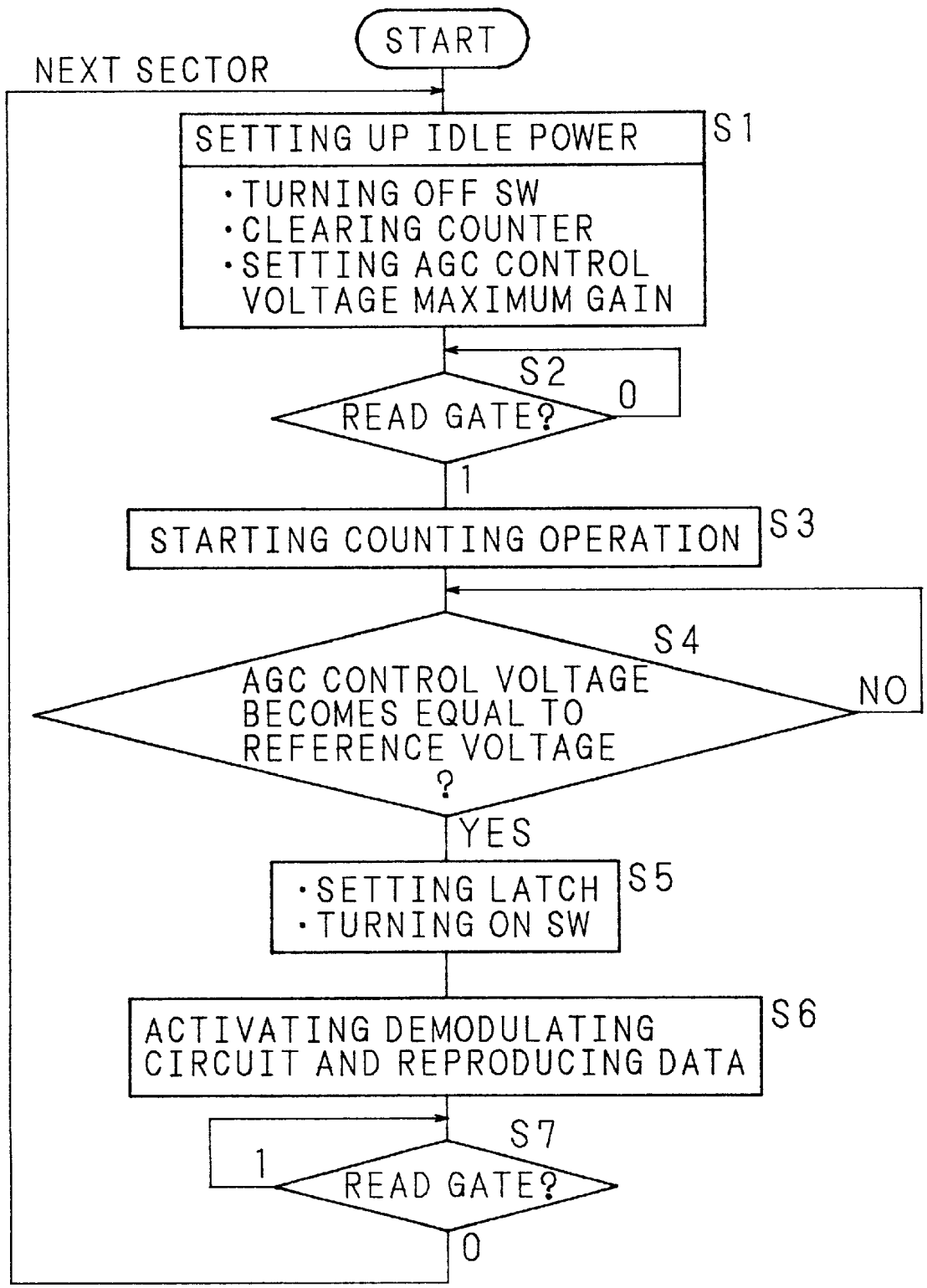
FIG. 9 is a flow chart for showing control sequence in the first embodiment of the invention.

Now, the control sequence will be described referring to a flow chart of FIG. 9.

First, the idle power (first reproducing power $P_1$) is applied.

The application of the idle power turns off the switch SW, clears the counter 21, and sets the AGC control voltage of the AGC circuit 13 so as to obtain the maximum gain (step S1).

It is determined whether the read gate is set at "1" or "0" (step S2). In the case of "0", this determination is repeated, and in the case of "1", the counter 21 is operated so as to start the counting operation (step S3).

It is determined whether or not the AGC control voltage of the AGC circuit 13 has become equal to the reference voltage $V_0$ (step S4). When they are not equal, this determination is repeated. When they are equal, the latch 24 is set, the counting operation of the counter 21 is stopped and the switch SW is turned on (step S5).

The demodulating circuit 14 is activated, so as to start a data reproducing operation (step S6).

It is determined whether the read gate is set at "1" or "0". In the case of "1", this determination is repeated. In the case of "0", the procedure returns to step S1, so as to repeat the aforementioned processes (step S7).

In this embodiment, when information is read from the SM portion and ID portion of a sector where the information is recorded by the emboss bit method, the necessary minimum power, that is, the first reproducing power $P_1$, is used. When information is read from the DATA portion and the like where the information is recorded by the MO method, the optimal reproducing power necessary for the magnetically induced super resolution reproduction can be used. As a result, the portions where the information is magneto-optically recorded can be avoided from being unnecessarily heated, and the degradation of the semiconductor laser can be avoided because the output thereof can be suppressed to a necessary minimum.

Embodiment 2

This embodiment utilizes both the principles shown in FIGS. 4A, 4B and 5, so that a recording power can be influenced by a reproducing power.

Figure 10:
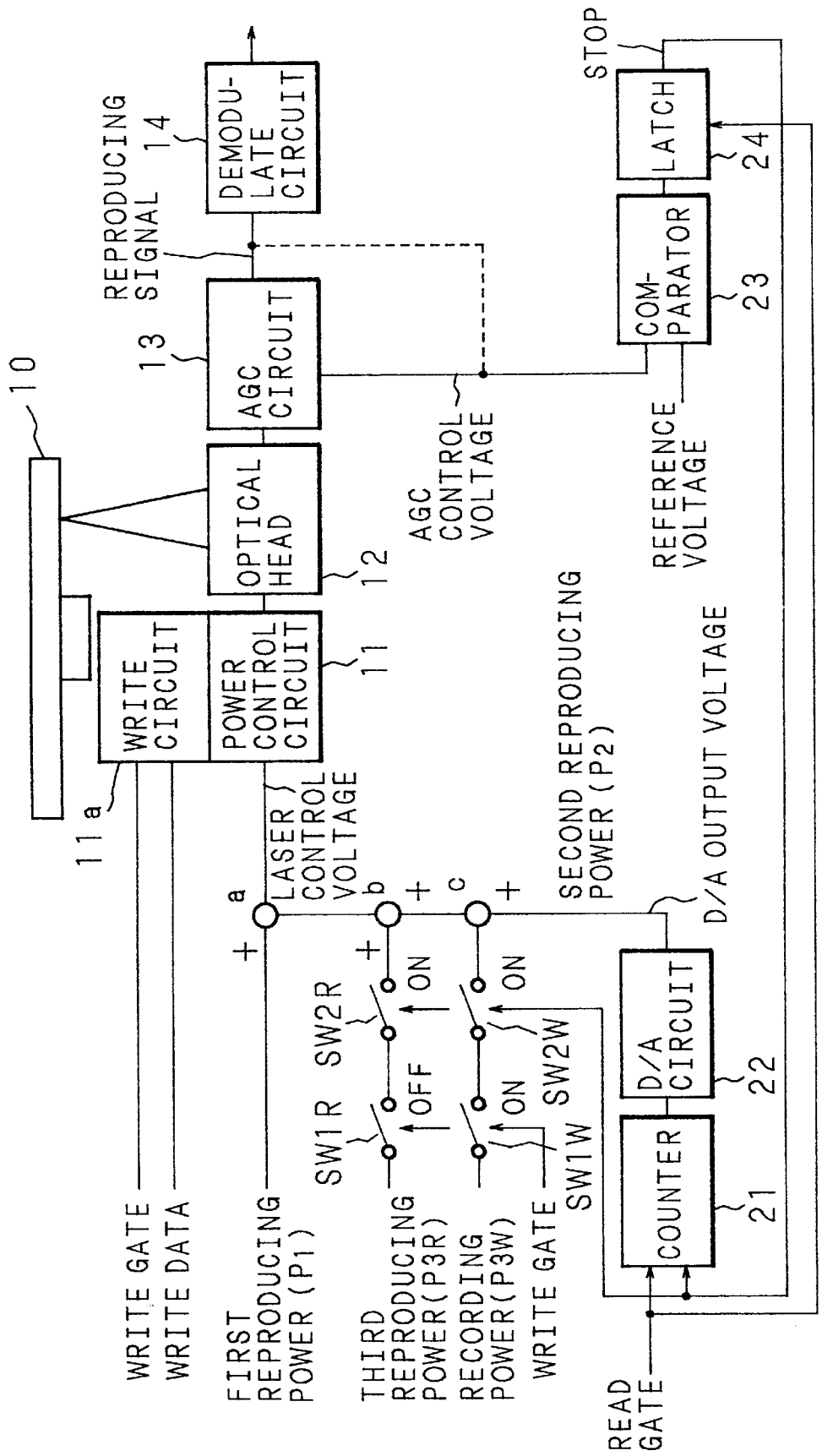
FIG. 10 is a block diagram for showing the configuration of a device of a second embodiment of the invention.

FIG. 10 is a block diagram for showing the configuration of a device of this embodiment.

An optical head 12 is supplied with data to be recorded and a reproducing or recording power by a write circuit 11*a* and a power control circuit 11*b*, respectively.

The write circuit 11*a* is supplied with a value of a write gate and write data by a control unit (not shown). When the write gate is set at "1", the write circuit 11*a* is activated, and the write data are supplied to the optical head 12 through the write circuit 11*a*, so as to record (write) the data in a magneto-optical disk 10.

The power control circuit 11*b* is supplied with a first reproducing power $P_1$ by first reproducing power application means, a second reproducing power $P_2$ by a D/A circuit 22 serving as second reproducing power application means, a third reproducing power P3R by third reproducing power application means, and a recording power P3W by recording power application means, independently or as a sum of two or more of these powers, if necessary.

Specifically, the power control circuit 11*b* is supplied with the first reproducing power $P_1$ by the first reproducing power application means through an adding point "a", the second reproducing power $P_2$ by the D/A circuit 22 serving as the second reproducing power application means through adding points "c","b" and "a", the third reproducing power P3R by the third reproducing power application means through switches SW1R and SW2R and the adding points "b" and "a", and the recording power P3W by the recording power application means through switches SW1W and SW2W and the adding points "c", "b" and "a".

The power control circuit 11*b* supplies a current corresponding to the applied voltage to the semiconductor laser of the optical head 12. The semiconductor laser irradiates the magneto-optical disk 10 of the MSR medium with a laser beam having a power in accordance with the received current.

The switches SW1R and SW1W are controlled to be turned on/off by the write gate. When the write gate is set at "0", the switch SW1W is in an off state and the switch SW1R is in an on state. When the write gate is set at "1", the switch SW1W is in an on state and the switch SW1R is in an off state.

The switches SW2R and SW2W are controlled to be turned on/off in response to a set signal outputted when the latch 24 is set. When the latch 24 is set, the switches SW2R and SW2W are in an on state, and when the latch 24 is reset, these switches are in an off state.

The remaining configuration is substantially the same as that of Embodiment 1, and hence, like reference numerals are used to refer to like elements and the description of these elements are omitted.

The operation of this embodiment will now be described referring to a time chart shown in FIG. 11.

Figure 11:
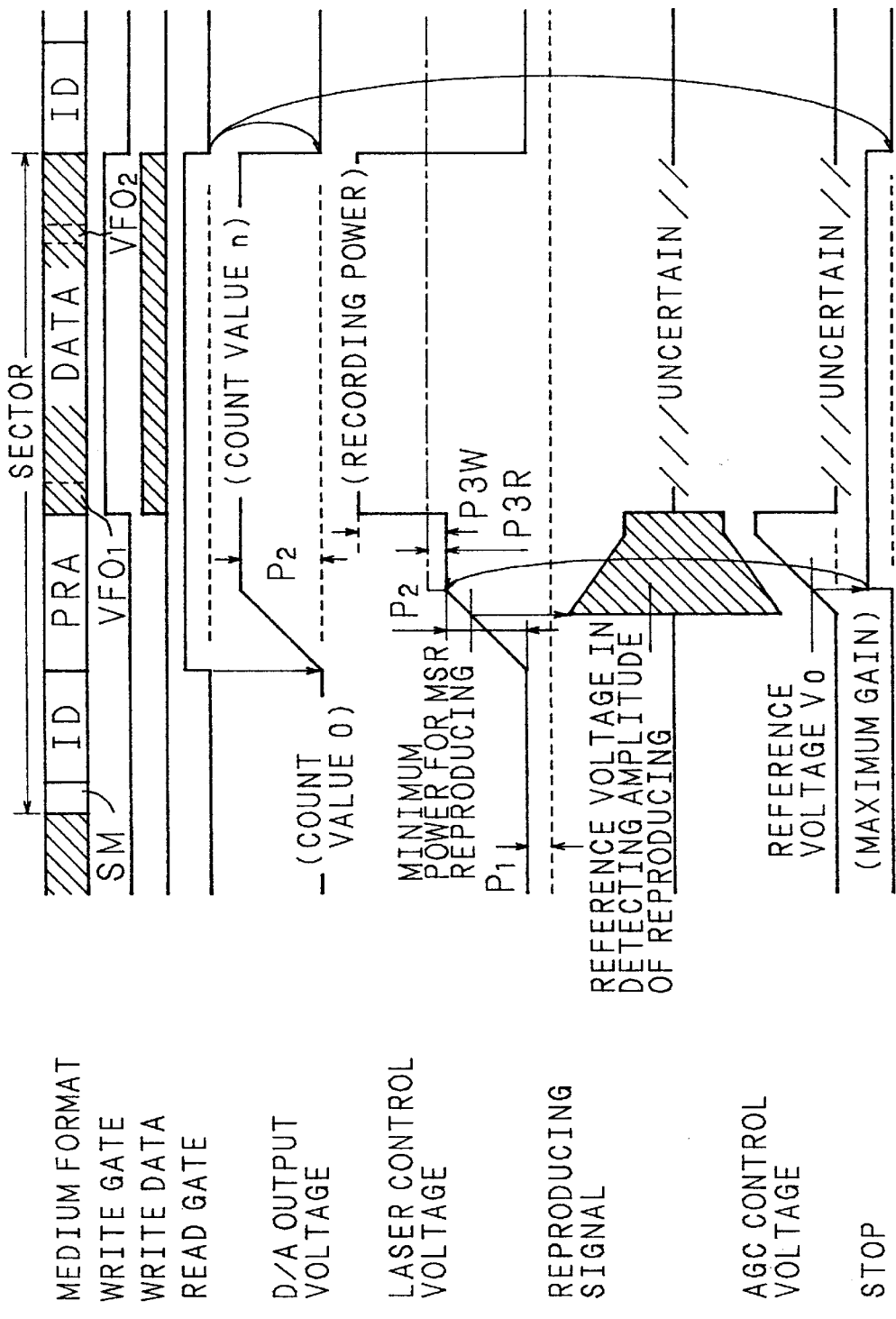
FIG. 11 is a time chart for showing the operation of the second embodiment of the invention.

By turning on the power supply, the first reproducing power $P_1$ of the idle power is applied to the power control circuit 11b as the laser control voltage as is shown in FIG. 11. The power control circuit 11b supplies a drive current corresponding to the laser control voltage to the semiconductor laser of the optical head 12, so as to irradiate the MSR medium with a laser beam having the power in accordance with this drive current, thereby reading the information recorded in the SM portion, the ID portion and the like by the emboss bit method.

The read information is compared with information of a sector instructed for data recording. When the read information accords with the instructed information, namely, when the sector is confirmed to be the sector for the data reading, the control unit not shown sets the read gate at "1", activates the counter 21 so as to start its counting operation, and resets the latch 24.

The D/A circuit 22 supplies the second reproducing power $P_2$ in accordance with the count value of the counter 21 so as to be added to the first reproducing power $P_1$ at the adding point "a". Thus, the power $P_1+P_2$ is applied to the power a control circuit 11b as the laser control voltage. The power control circuit 11b supplies a drive current in accordance with this laser control voltage to the semiconductor laser of the optical head 12, so as to irradiate the MSR medium with a laser beam having the power in accordance with this drive current.

The laser beam enters, after irradiating the ID portion of the sector, the PRA portion where information is recorded by the MO method. When the reproducing power $P_1+P_2$ is increased and the temperature of the MSR medium reaches a temperature at which the magnetically induced super resolution reproduction is started, an aperture is formed on the MSR medium, and magnetically induced super resolution reproduction of the information therein starts. Then, a reproducing signal as is shown in FIG. 11 is outputted from the optical head 12 to the AGC circuit 13.

When the reproducing signal appears, the AGC control voltage starts to increase. When the AGC control voltage becomes equal to the reference voltage $V_0$, the comparator 23 detects this and outputs a predetermined signal to the latch 24. In response to this signal, the latch 24 is set, and outputs a set signal to the counter 21 and the switches SW2R and SW2W.

Then, as is shown in FIG. 11, the counter 21 stops the counting operation, and the second reproducing power $P_2$ is fixed at a voltage value attained when the counter 21 stops, so as to make constant the laser control voltage.

Since the AGC circuit 13 is set so that the initial AGC control voltage can obtain the maximum gain, the amplitude of the reproducing signal is abruptly increased. As the AGC control voltage starts to increase, the amplitude of the reproducing signal is decreased. After reaching a predetermined level, the AGC control voltage is retained substantially constant, and the amplitude of the reproducing signal is also retained substantially constant. Under this condition, the signal recorded in the PRA portion is completed to be read.

In a recording operation, the third reproducing power P3R is not necessarily added.

When the information in the PRA portion is completed to be read, the write gate is set at "1".

As a result, the switch SW1R is turned off and the switch SW1W is turned on. Therefore, the recording power auxiliary voltage P3W is added to the second reproducing power $P_2$ at the adding point "c", and hence, the laser control voltage becomes the total power $P_1+P_2+P3W$, which is the optimal recording power influenced by the reproducing powers $P_1$ and $P_2$.

At the same time, the write data are supplied to the optical head 12 through the write circuit 11a, so as to start data recording in the MSR medium.

When the data recording in the DATA portion of the sector is completed, the write gate is set at "0" as is shown in FIG. 11, the transfer of the write data is stopped, the read gate is set at "0" and the latch 24 is reset. As a result, the counter 21 is cleared, the second reproducing power $P_2$ becomes 0 V, the laser control voltage returns to the voltage of the first reproducing power $P_1$. Thus, the device is placed in a standby state for the process of a subsequent sector.

Figure 12:
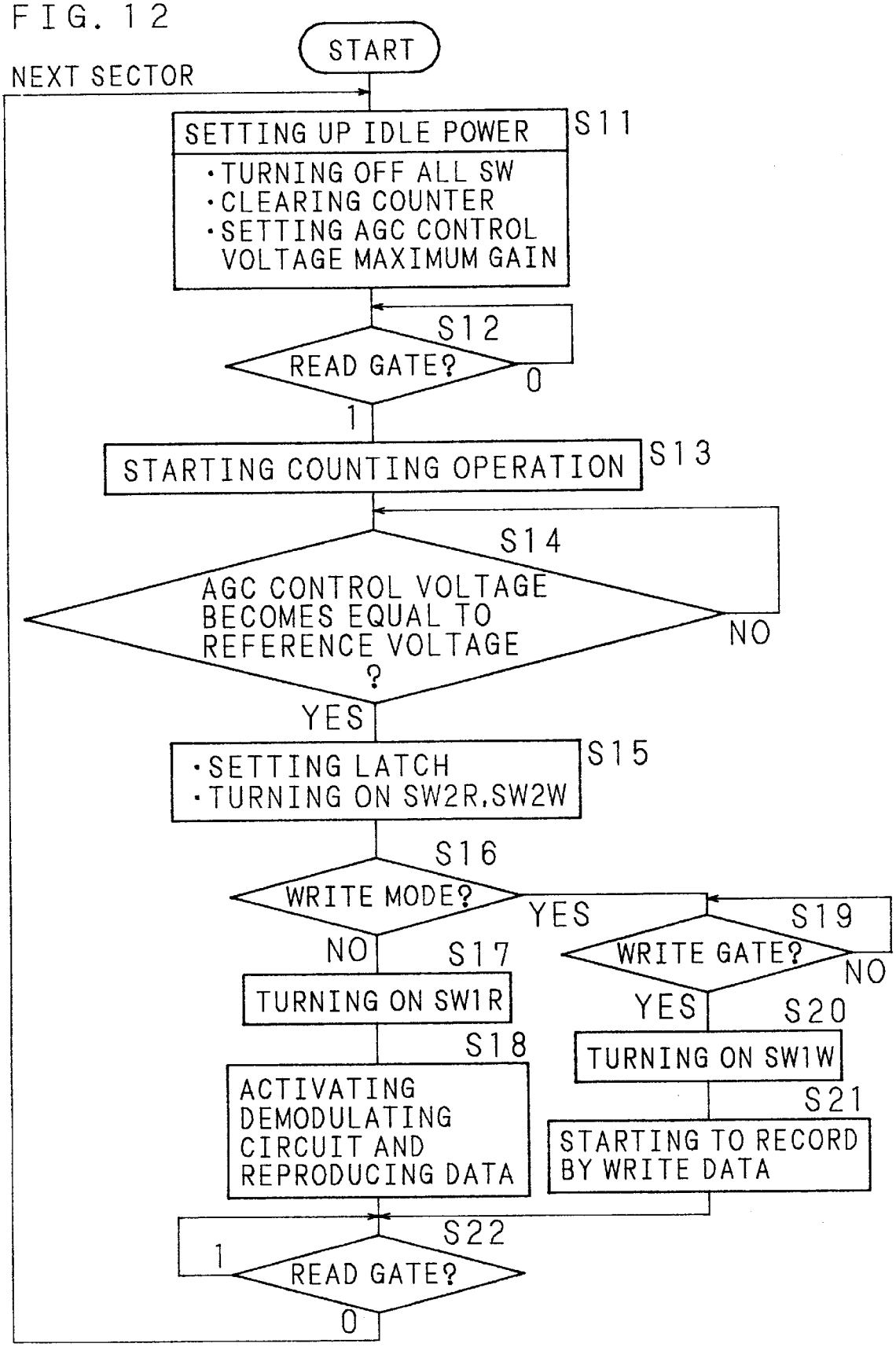
FIG. 12 is a flow chart for showing control sequence in the second embodiment of the invention.

Now, the control sequence will be described referring to a flow chart shown in FIG. 12.

The first reproducing power $P_1$, that is, the idle power, is set, and all the switches SW1R, SW1W, SW2R and SW2W are turned off, the counter 21 is cleared and the AGC control voltage is initially set to obtain the maximum gain (step S11).

It is determined whether the read gate is set at "1" or "0" (step S12). In the case of "0", this determination is repeated. In the case of "1", the counter 21 is activated so as to start the counting operation (step S13).

Then, it is determined whether or not the AGC control voltage has become equal to the reference voltage $V_0$ (step S14). When the AGC control voltage is not equal to the reference voltage $V_0$, this determination is repeated. When they are equal, the latch 24 is set, the counter 21 is stopped and the switches SW2R and SW2W are turned on (step S15).

Then, it is determined whether or not the device is in the write mode (step S16). When it is not in the write mode, the switch SW1R is turned on (step S17), and the demodulating circuit 14 is activated so as to reproduce data (step S18).

When the device is determined to be in the write mode in step S16, it is determined whether the write gate is set at "1" or "0" (step S19). In the case of "0", this determination is repeated. In the case of "1", the switch SW1W is turned on (step S20), and a writing, i.e., recording, operation of the write data is started (step S21).

Then, it is determined whether the read gate is set at "1" or "0" (step S22). In the case of "1", this determination is repeated. In the case of "0", the procedure returns to step S11, and the device is placed in a standby state for the process of a subsequent sector.

In Embodiments 1 and 2, the timing of forming the aperture on the MSR medium for starting the magnetically induced super resolution reproduction of the information therein is detected by capturing the rise of the AGC control voltage or the amplitude of the reproducing signal, and the reproducing power is adjusted to be optimal in the PRA portion. However, the reproducing power can be adjusted in, for example, the $VFO_1$ portion provided at the head of the DATA portion or the $VFO_2$ portion provided in the DATA portion.

The remaining operation is substantially the same as that of Embodiment 1, and hence, the description is omitted.

In Embodiment 2, in addition to the effects attained by Embodiment 1, the recording power can be corrected in consideration of the change of the temperature of the medium because the recording power is influenced by the reproducing power. As a result, the recording power can be more appropriately set.

In either of Embodiments 1 and 2, the reproducing power is controlled to be increased from the lowest power (i.e., the power $P_1$) to the highest power (i.e., the total power $P_1+P_2+P_3$ or $P_1+P_2+P3R$). However, the reproducing power can be controlled to be decreased from a high reproducing power, or increased or decreased from an intermediate reproducing power, so as to detect the timing of start of the magnetically induced super resolution reproduction.

In this embodiment, the reproducing power is appropriately set by detecting the start of the magnetically induced super resolution reproduction of magneto-optically recorded data from an MSR medium. Therefore, an appropriate reproducing power can be precisely applied without being affected by the fluctuation in the material of the MSR medium and a blur thereon, so that a necessary signal can be accurately reproduced.

Furthermore, since the reproducing power is appropriately adjusted at the head of the portion where data are magneto-optically recorded, there is no need for phase adjustment.

Therefore, a data portion to be reproduced can be accurately reproduced by using an appropriate reproducing power.

In addition, when the reproducing power is appropriately adjusted in the synchronizing signal portion and/or resynchronizing signal portion, there is no need to provide a separate power adjustment area. This results in increasing a recording area.

Furthermore, the start of the magnetically induced super resolution reproduction from the MSR medium is detected by using a rise of the amplitude of the reproducing signal or a rise of the AGC control voltage. Therefore, the start of the magnetically induced super resolution reproduction can be accurately detected, so as to appropriately set the reproducing power.

Moreover, when the recording power used in a recording operation is influenced by the reproducing power, it is possible to correct the recording power in view of change of the recording conditions caused by the temperature change of the medium. As a result, the recording power can be more appropriately set.

Furthermore, since the reproducing power is set through the three steps, the appropriate reproducing power can be accurately set at appropriate timing, and it is possible to avoid heating an unnecessary area. As a result, the degradation of the medium can be avoided, and the lifetime of the light beam source can be elongated.

Additionally, since the reproducing power is controlled to be increased in a procedure of reproducing information from the MSR medium, it is possible to avoid application of a large reproducing power to an unnecessary area. Therefore, the bMSR medium and the light beam source are prevented from degrading due to the heat, resulting in elongating their lifetime.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An apparatus for reproducing information recorded in a medium, the medium having a plurality of tracks, the tracks having a plurality of sectors, and the sectors each having a first area in which information was recorded using MO techniques, and a second area in which the information was not recorded using said MO techniques, said apparatus comprising:

a light source for producing a light beam, means for scanning the light beam over the sectors in succession by rotating the medium, the light beam being reflected by the medium, means for reproducing information recorded in the medium from the reflected light of the light beam, and means for controlling the power applied to the light source, and the resulting intensity of the light beam, as the light beam scans the medium said controlling means providing a first power level P1 to the light source for reproducing information in the second areas, said controlling means setting an initial power level for reproducing information using MO techniques by increasing a power level of the light source from the first power level to a second power level P1+P2, said second variable power level P2 being decided in accordance with information reproduction results when said light beam scans a head portion of said first areas, and said controlling means setting an optimum power level for reproduction of the information using MO techniques by adding a predetermined third power level P3 to the initial power level for reproducing information P1+P2.

2. The apparatus of claim 1 wherein the second area includes embossed pits, and the information in the second area is reproduced by measuring diffraction of the light beam which is reflected by the medium.

3. A method for reproducing information from a recording medium, the recording medium having a plurality of tracks, the tracks having a plurality of sectors, and the sectors each having preformatted area having an ID data portion and/or a sector mark portion reproduced without MO techniques, a power control portion, and an information data portion in which at least a part of the information recorded therein may only be reproduced using MO techniques, comprising the steps of:

reproducing data in the ID portion and/or the sector mark portion using a light beam of a first power level P1;

obtaining an adjustment value P1+P2 of the light beam at which reproduction of information recorded using MO techniques begins, P2 being decided in accordance with information reproducing results when the light beam scans the power control portion;

optimizing the power level of the light beam for reproduction of the information in the information data portion by increasing said adjustment value P1+P2 by a predetermined value P3.

4. An apparatus for reproducing information from a recording medium, the recording medium having a plurality of tracks, the tracks having a plurality of sectors, and the sectors each having a preformatted area having an ID data portion and/or a sector mark portion reproduced without MO techniques, a power control portion, and an information data portion in which at least a part of the information recorded therein may only be reproduced using MO techniques, comprising:

means for reproducing data in the ID portion using a light beam of a first power level P1;

means for obtaining an adjustment value P1+P2 of the light beam sufficient to reproduce information using MO techniques, P2 being decided in accordance with information reproducing results when the light beam scans the power control portion;

means for optimizing a reproduction power level in the information data portion by increasing said adjustment value P1+P2 by a predetermined value P3;

means for reproducing information recorded in the information data portion by impinging the light beam on the information data portion at said optimized reproduction power level (P1+P2+P3).

5. A method for reproducing information comprising:

impinging a light beam on an MSR medium, the MSR medium reflecting the light beam to produce a signal which reproduces a recorded information when the light beam exceeds a predetermined power level, setting the power of the light beam at a level below the level required for information reproduction from the MSR medium, increasing the power of the light beam, detecting the power of the light beam when the reproduction of information begins, and further increasing the power of the light beam so as to get an optimum reproducing signal, in accordance with the detected power of the light beam.

6. An apparatus for reproducing information comprising:

means for impinging a light beam on an MSR medium, the MSR medium reflecting the light beam to produce a signal which reproduces a recorded information when the light beam exceeds a predetermined power level, means for setting the power of the light beam at a level below the level required for information reproduction from the MSR medium, means for increasing the power of the light beam, means for detecting the power of the light beam when the reproduction of information from the MSR medium begins, and means for further increasing the power of the light beam so as to get an optimum reproducing signal, in accordance with the detected power of the light beam.

7. A method for reproducing information from a recording medium, the recording medium having a plurality of tracks, the tracks having a plurality of sectors, and the sectors each having an ID data portion and/or a sector mark portion followed by an information data portion, comprising the steps of:

setting a first power level of the light beam in the ID portion and/or the sector mark portion of each sector, before the light beam reaches the information data portion:

increasing the power of the light beam from the first power level to a second power level, until a transition to a reproducing mode for the information data is detected; and further increasing the power of the light beam by a predetermined value when the information data is detected.

8. An apparatus for reproducing information from a recording medium, the recording medium having a plurality of tracks, the tracks having a plurality of sectors, and the sectors each having an ID data portion and/or a sector mark portion followed by an information data portion, comprising:

means for setting a first power level of the light beam in the ID portion and/or the sector mark portion of each sector, before the light beam reaches the information data portion:

means for increasing the power of the light beam from the first power level to a second power level, until a transition to a reproducing mode for the information data is detected; and means for further increasing the power of the light beam by a predetermined value when the information data is detected.

9. A method for recording information on a medium using apparatus for recording and reproducing information on the medium, the recording medium having a plurality of tracks, the tracks having a plurality of sectors, and the sectors each having an ID data portion and/or a sector mark portion followed by an information data portion, the apparatus reproducing the information by impinging a light beam on the medium at a first power level which is sufficient to reproduce information in the ID data portion and/or the sector mark portion, and increasing the light beam by a second power level, the sum of the first and second power levels being sufficient to reproduce information data, but insufficient to record information, comprising:

setting the power level at the first power level P1 lower than a power level necessary to reproduce information using MO techniques when the light beam is over the ID data portion and/or the sector mark portion of each sector;

increasing the power level of the light beam by a second power level P2 until reproduction of information recorded using MO techniques is detected; and determining a power level for recording information using MO techniques by increasing the power level P1+P2 sufficient to reproduce information from the medium by a predetermined amount P3.

10. An apparatus for recording information on a medium, the recording medium having a plurality of tracks, the tracks having a plurality of sectors, and the sectors each having an ID data portion and/or a sector mark portion followed by an information data portion, comprising:

means for reproducing the information by impinging a light beam on the medium at a first power level which is sufficient to reproduce information in the ID data portion and/or the sector mark portion, the first power level being insufficient to reproduce information using MO techniques;

means for setting a second power level by increasing the power level of the light beam from the first power level to a level sufficient to reproduce information using MO techniques;

means for setting the power level at the first power level when the light beam is over the ID data portion and/or the sector mark portion of each sector, and means for setting the power level at a third power level, sufficient to record the information on the medium, when the light beam is over the information data portion of each sector, said third level being determined as the second power level plus a predetermined value.

11. An apparatus for reproducing information recorded in a medium, the medium having a plurality of tracks, the tracks having a plurality of sectors, and the sectors each having a first area in which information is recorded using one of MO and MSR techniques, and a second area which is a preformatted area, in which information was preformatted, having a first portion in which the information was not recorded using either MO and MSR techniques and a second portion in which information was recorded using one of MO and MSR techniques, comprising:

a light source for producing a light beam, means for scanning the light beam over the sectors in succession by rotating the medium, the light beam being reflected by the medium, means for reproducing information recorded in the medium from the reflected light of the light beam, and means for controlling the power applied to the light source, and the resulting intensity of the light beam, as the light beam scans the medium, said controlling means providing a first power level P1 to the light source for reproducing information in the second areas which was not recorded using either of MO and MSR techniques, increasing the power level from the first power level to a second power level P2 at which an abrupt rise of a reproducing signal is detected while said light beam scans in the second portion of the second areas, and then increasing the power level applied by a predetermined amount P3 to optimize the power level for reproduction of the information in the first areas.

12. A method for reproducing information from an MSR medium, the MSR medium reflecting the light beam to produce a signal which reproduces a recorded information when the light beam exceeds a predetermined power level, comprising:

setting a first power level of the light beam below at a level insufficient to reproduce information using MSR techniques;

increasing the power of the light beam from the first power level to a second power level until a transition to a reproducing mode for the information data recorded on the MSR medium is detected; and adding a predetermined amount of power to the second power level so as to get as optimum reproducing signal.

13. An apparatus for reproducing information from an MSR medium, the MSR medium reflecting the light beam to produce a signal which reproduces a recorded information when the light beam exceeds a predetermined power level, comprising:

means for setting a first power level of the light beam below at a level insufficient to reproduce information using MSR techniques;

means for increasing the power of the light beam from the first power level to a second power level, until a transition to a reproducing mode for the information data recorded on the MSR medium is detected; and means for adding a predetermined amount of power to the second power level so as to get as optimum reproducing signal.

14. A method for recording and reproducing information from an MSR medium according to claim 5, further comprising:

setting the power of the light beam for recording to reflect the power of the light beam for reproducing the MSR medium.

15. The method for recording and reproducing information according to claim 14, wherein the power of the light beam for recording is obtained by adding the variation k(Prb−Pra) of the power for reproducing to the power of the light beam for trial writing operation, provided Prb indicates the beam power for an actual recording operation, Pra indicates a corrected beam power for a trial reproducing operation, and k indicates a correction coefficient.

16. A method for recording and reproducing information from an MSR medium according to claim 7, further comprising:

setting the power of the light beam for recording to reflect the power of the light beam for reproducing the recording medium.

17. The method for recording and reproducing information according to claim 16, wherein the power of the light beam for recording is obtained by adding the variation k(Prb−Pra) of the power for reproducing to the power of the light beam for trial writing operation, provided Prb indicates the beam power for an actual recording operation, Pra indicates a corrected beam power for a trial reproducing operation, and k indicates a correction coefficient.

18. A method for recording and reproducing information from an MSR medium according to claim 12, further comprising:

setting the power of the light beam for recording to reflect the power of the light beam for reproducing the MSR medium.

19. The method for recording and reproducing information according to claim 18, wherein the power of the light beam for recording is obtained by adding the variation k(Prb−Pra) of the power for reproducing to the power of the light beam for trial writing operation, provided Prb indicates the beam power for an actual recording operation, Pra indicates a corrected beam power for a trial reproducing operation, and k indicates a correction coefficient.

* * * * *